(12) United States Patent
Zhang

(10) Patent No.: US 11,119,375 B1
(45) Date of Patent: Sep. 14, 2021

(54) DISPLAY PANEL AND ELECTRONIC DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Yinfeng Zhang, Shenzhen (CN)

( * ) Notice: Subject to any disclaimer, the term of this patent is extended or adjusted under 35 U.S.C. 154(b) by 0 days.

(21) Appl. No.: 16/973,053

(22) PCT Filed: Jul. 9, 2020

(86) PCT No.: PCT/CN2020/101046
§ 371 (c)(1),
(2) Date: Dec. 8, 2020

(30) Foreign Application Priority Data

May 19, 2020 (CN) .......................... 202010424222.1

(51) Int. Cl.
*G02F 1/1362* (2006.01)
(52) U.S. Cl.
CPC .. *G02F 1/136286* (2013.01); *G02F 1/136209* (2013.01); *G02F 1/136218* (2021.01)
(58) Field of Classification Search
None
See application file for complete search history.

(56) References Cited

U.S. PATENT DOCUMENTS

| 2008/0136992 | A1 | 6/2008 | Kim |
| 2016/0216585 | A1 | 7/2016 | Park et al. |
| 2017/0160852 | A1 | 6/2017 | Ahn et al. |
| 2017/0219896 | A1 | 8/2017 | Choi |
| 2020/0144296 | A1* | 5/2020 | Choi .................. H01L 27/1248 |

FOREIGN PATENT DOCUMENTS

| CN | 101201499 A | 6/2008 |
| CN | 104834139 A | 8/2015 |
| CN | 106886110 A | 6/2017 |
| CN | 107479271 A | 12/2017 |

* cited by examiner

*Primary Examiner* — Phu Vu

(57) ABSTRACT

A display panel and an electronic device are provided. The display panel includes a plurality of data lines positioned in a display region and arranged along a first direction; a plurality of scan lines; a plurality of sub-pixels; a plurality of light-shielding electrodes positioned in the display region and arranged along the first direction; a plurality of connection lines positioned in a non-display region; wherein each of the light-shielding electrodes overlaps corresponding one of the data lines, openings are provided between each two of the light-shielding electrodes so that each two of the light-shielding electrodes are not connected to each other, and each of the connection lines is connected to one of the light-shielding electrodes.

16 Claims, 8 Drawing Sheets

DISPLAY PANEL AND ELECTRONIC DEVICE

FIELD OF INVENTION

The present application relates to the technical field of display panels, and in particular to a display panel and an electronic display device.

BACKGROUND OF INVENTION

In a field of display technologies today, liquid crystal displays (LCDs) have many advantages such as thin body, power saving, no radiation, etc., and have been widely used in products such as LCD TVs, mobile phones, personal digital assistants (PDAs), digital cameras, computer screens, or laptop screens, etc.

An array substrate of a conventional liquid crystal display panel generally includes a substrate, a plurality of scan lines, a common electrode line provided on the substrate, and a plurality of data lines and a plurality of pixel electrodes disposed on the scan lines and the common electrode and arranged perpendicular to the scan lines. The data lines and the scan lines intersect to form a plurality of sub-pixel regions, the pixel electrodes are provided corresponding to the plurality of sub-pixel regions, a color resist layer and a common electrode layer are provided on a color filter substrate, and a black matrix (BM) is provided on the color filter substrate corresponding to a boundary of the adjacent pixel regions to shield light.

An existing liquid crystal display panel adopts a color filter on array (COA) technology in which a color resist layer of a traditional color filter substrate is arranged on an array substrate, and a data line BM less (DBS) technology. The so-called COA technology refers to an arrangement of the color resist layer provided on the color filter substrate in the conventional art between the pixel electrodes and the data lines in the array substrate, and the so-called DBS technology refers to light-shielding electrodes (DBS electrodes) disposed on the data lines and arranged in a same layer as the pixel electrodes. The light-shielding electrodes can shield data line signals so that liquid crystal molecules corresponding to the data lines can be shielded without rotating, thereby eliminating the black matrix (BM) provided above the data lines; moreover, it can effectively improve a light leakage design of a black matrix (BM) shift caused by an alignment accuracy of the array substrate and the color filter substrate, and therefore it is widely used. At the same time, the light-shielding electrodes (DBS electrodes) are designed to be able to individually feed a potential, and the potential can be adjusted during an alignment and normal display process, thereby achieving alignment optimization and image quality improvement.

However, refer to FIG. 1, FIG. 2, FIG. 3(a), and FIG. 3(b). FIG. 1 is a top view of a partial structure of a display region of a display panel, and FIG. 2 is a cross-sectional diagram of a partial layer structure taken along line B-B in FIG. 1. The display region of the display panel includes a substrate 10, scan lines 11, an insulating layer 12, data lines 13, a color resist layer 14, light-shielding electrodes 15, and pixel electrodes 16. The color resist layer 14 includes red color resists 141, green color resists 142, and blue color resists 143. The red color resists 141 and the green color resists 142 have overlapping portions of horns 145 above the data lines 13, the green color resists 142 and the blue color resists 143 have overlapping portions of horns 146 above the data lines 13, and the blue color resists 143 and the red color resists 141 have overlapping portions of horns 147 above the data lines 13, and the light-shielding electrodes 15 are provided on surfaces of the horns 145, 146, and 147. The light-shielding electrodes 15 are usually made of indium tin oxide (ITO) material and are connected in parallel with an entire surface, and are connected to an electric signal input terminal (pad) on a periphery, so as to realize a function of a single input terminal to adjust the entire surface. Due to a terrain of the horns 145, 146, and 147, the light-shielding electrodes 15 have obvious differences in the terrain depending on the etching, and the light-shielding electrodes 15 are offset (or asymmetrical) with respect to the data lines 13 or the pixel electrodes 16. From a preset d1 equal to d2 as shown in FIG. 3(a) changes to an unnecessary d1 not equal to d2, at this time, a shading or a shielding effect of a light-shielding electrode 15 becomes worse, and a topography (height and width) of the horns 145, 146 and 147 is not same, resulting in an offset (or asymmetry) of the light-shielding electrodes 15 on the surfaces of the horns 145, 146, and 147 also being different. Therefore, the light-shielding electrodes 15 connected in parallel on the entire surface cannot simultaneously perform good light-shielding and shielding functions in various sub-pixels.

SUMMARY OF INVENTION

Technical Problem

Embodiments of the present application provide a display panel and an electronic device to solve a problem of deterioration in display image quality caused by the shift (or asymmetry) of light-shielding electrodes relative to data lines or pixel electrodes on color resist horns in an existing display panel.

Technical Solution

A display panel, including a display region and a non-display region surrounding the display region, wherein the display panel further includes:

a plurality of data lines positioned in the display region and arranged along a first direction;

a plurality of scan lines positioned in the display region and arranged along a second direction, wherein the second direction is perpendicular to the first direction;

a plurality of sub-pixels positioned at intersections of the data lines and the scan lines;

a plurality of light-shielding electrodes positioned in the display region and arranged along the first direction; and a plurality of connection lines positioned in the non-display region;

wherein each of the light-shielding electrodes overlaps the data lines corresponding to the light-shielding electrodes, openings are provided between each two of the light-shielding electrodes so that each two of the light-shielding electrodes are not connected to each other, and each of the connection lines is connected to one of the light-shielding electrodes.

The present application further provides an electronic device including a display panel, wherein the display panel includes a display region and a non-display region surrounding the display region, and the display panel further includes:

a plurality of data lines positioned in the display region and arranged along a first direction;

a plurality of scan lines positioned in the display region and arranged along a second direction, wherein the second direction is perpendicular to the first direction;

a plurality of sub-pixels positioned at intersections of the data lines and the scan lines;

a plurality of light-shielding electrodes positioned in the display region and arranged along the first direction; and a plurality of connection lines positioned in the non-display region;

wherein each of the light-shielding electrodes overlaps the data lines corresponding to the light-shielding electrodes, openings are provided between each two of the light-shielding electrodes so that each two of the light-shielding electrodes are not connected to each other, and each of the connection lines is connected to one of the light-shielding electrodes.

Beneficial Effect

The beneficial effect of the present application is that the light-shielding electrodes in the display region are not connected to each other, and in the non-display region, the light-shielding electrodes positioned between different sub-pixels or different color sub-pixels are electrically connected through different connection lines, respectively. Moreover, the connection lines are respectively supplied with electrical signals, so as to simultaneously improve a shading and a shielding effect of the light-shielding electrodes between different sub-pixels or different color sub-pixels in the display region, preventing the deterioration of display image quality caused by the shift (or asymmetry) of light-shielding electrodes on horn surfaces of adjacent part of the different sub-pixels or different color sub-pixels.

DETAILED DESCRIPTION OF EMBODIMENTS

Figure 1:
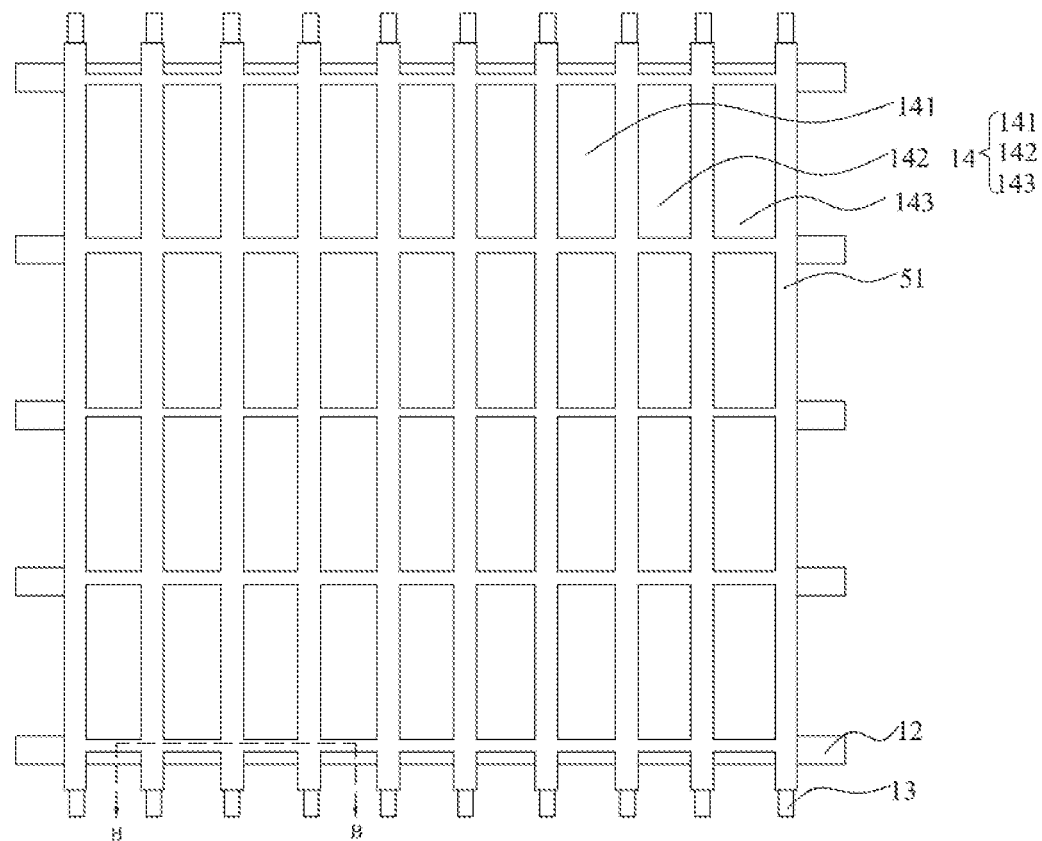
FIG. 1 is a schematic top view of a partial structure of a display region of a display panel according to a conventional art.
Figure 2:
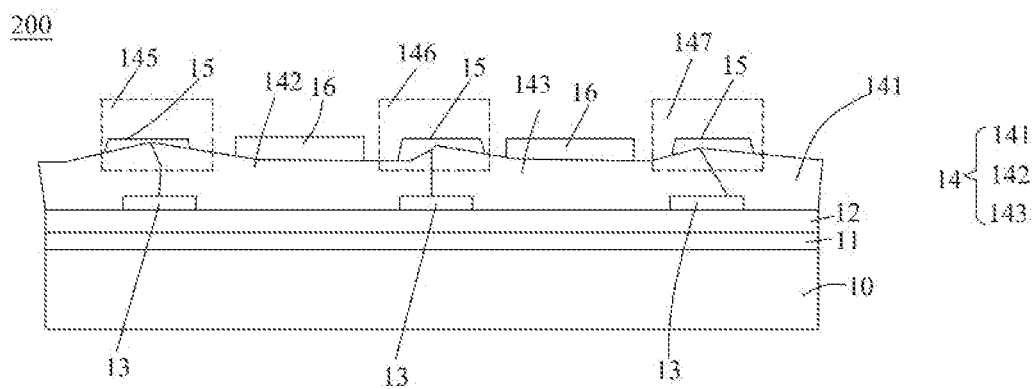
FIG. 2 is a schematic cross-sectional view taken along line B-B of the partial structure of the display region of the display panel according to the conventional art.
Figure 3A:
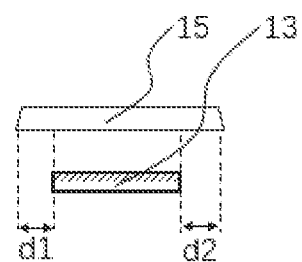
FIG. 3(a) is a schematic diagram of a preset cross-section of a light-shielding electrode of the display panel relative to a data line provided in the conventional art.
Figure 3B:
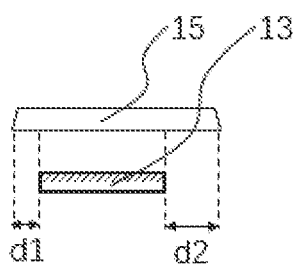
FIG. 3(b) is a schematic diagram of a shift cross-section of the light-shielding electrode of the display panel relative to the data line provided in the conventional art.

The following content combines with the drawings and the embodiment for describing the present application in detail. It is obvious that the following embodiments are merely some embodiments of the present application, but not all the embodiments. Based on the embodiments in the present application, for the skilled persons of ordinary skill in the art without creative effort, the other embodiments obtained thereby are still covered by the present application.

In the description of the present invention, it is to be understood that the terms such as "center", "longitudinal", "transverse", "length", "width", "thickness", "upper", "lower", "front", "rear", "left", "right", "vertical", "horizontal", "top", "bottom", "inside", "outside", "clockwise", "counterclockwise", etc., the orientation or positional relationship of the indications is based on the orientation or positional relationship shown in the drawings, and is merely for the convenience of the description of the invention and the simplified description, rather than indicating or implying that the device or component referred to has a specific orientation, in a specific orientation. The construction and operation are therefore not to be construed as limiting the invention. In addition, unless otherwise defined, any technical or scientific term used herein shall have the common meaning understood by a person of ordinary skills. Such words as "first" and "second" used in the specification and claims are merely used to differentiate different components rather than to represent any order, number or importance. In the description of the present invention, the meaning of "plurality" is two or more unless specifically defined otherwise.

In the description of the present application, it should be noted that the terms "installation", "connected", and "coupled" should be understood in a broad sense, unless explicitly stated and limited otherwise. For example, they may be fixed connections, removable connected or integrally connected; it can be mechanical, electrical, or can communicate with each other; it can be directly connected, or it can be indirectly connected through an intermediate medium, it can be an internal communication of two elements or an interaction relationship of two elements. For those of ordinary skill in the art, the specific meanings of the above terms in the present application can be understood according to specific situations.

In the present invention, the first feature "on" or "under" the second feature can include direct contact of the first and second features, and can also be included that the first and second features are not in direct contact but are contacted by additional features between them, unless otherwise specifically defined and defined. Moreover, the first feature is "above", "on", and "on the top of" of the second feature, including the first feature directly above and diagonally above the second feature, or simply means that the first feature is horizontally higher than the second feature. The first feature is "under", "below", and "beneath" the second feature, including the first feature directly below and diagonally below the second feature, or merely the first feature is horizontally less than the second feature.

The following disclosure provides many different implementations or examples for implementing different structures of the present application. To simplify the disclosure of the present application, the components and settings of specific examples are described below. Of course, they are merely examples and are not intended to limit the application. Furthermore, the present application may repeat reference numbers and/or reference letters in different examples, and such repetition is for the sake of simplicity and clarity, and does not by itself indicate a relationship between the various embodiments and/or settings discussed. In addition, examples of various specific processes and materials are provided in the present application, but those of ordinary skill in the art can be aware of the application of other processes and/or the use of other materials.

An embodiment of the present application provides a display panel including a display region and a non-display region surrounding the display region. The display panel includes a plurality of data lines positioned in the display region and arranged along a first direction; a plurality of scan lines positioned in the display region and arranged along a second direction, wherein the second direction is perpendicular to the first direction; a plurality of sub-pixels positioned at intersections of the data lines and the scan lines; a plurality of light-shielding electrodes positioned in the display region and arranged along the first direction; and a plurality of connection lines positioned in the non-display region; wherein each of the light-shielding electrodes overlaps the data lines corresponding to the light-shielding electrodes, openings are provided between each two of the light-shielding electrodes so that each two of the light-shielding electrodes are not connected to each other, and each of the connection lines is connected to one of the light-shielding electrodes.

In the present application, the light-shielding electrodes in the display region are not connected to each other, and in the non-display region, the light-shielding electrodes positioned between different sub-pixels or different color sub-pixels are electrically connected through different connection lines, respectively, and the connection lines are respectively supplied with electrical signals, so as to simultaneously improve a shading and a shielding effect of the light-shielding electrodes between different sub-pixels or different color sub-pixels in the display region, preventing the deterioration of display image quality caused by the shift (or asymmetry) of light-shielding electrodes on horn surfaces of adjacent part of the different sub-pixels or different color sub-pixels.

The application will be further described below with reference to the drawings and embodiments.

First Embodiment

Figure 4:
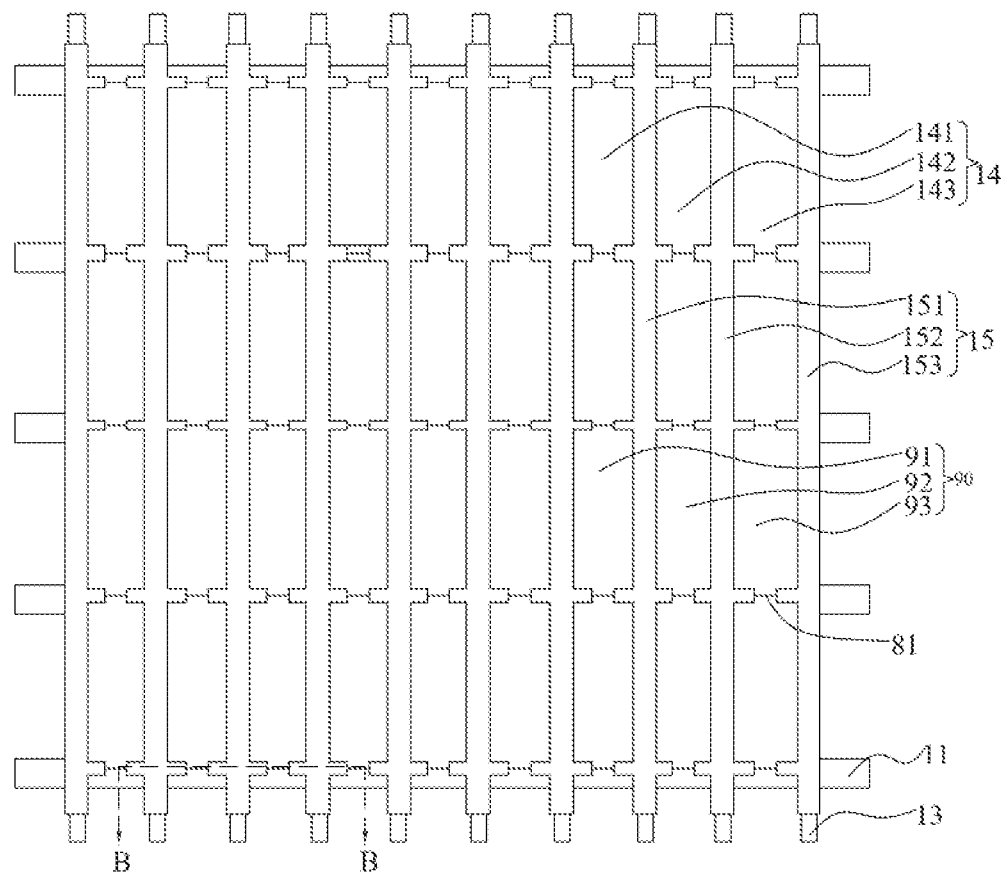
FIG. 4 is a schematic top view of a partial structure of a display region of a display panel according to a first embodiment of the present application.
Figure 5:
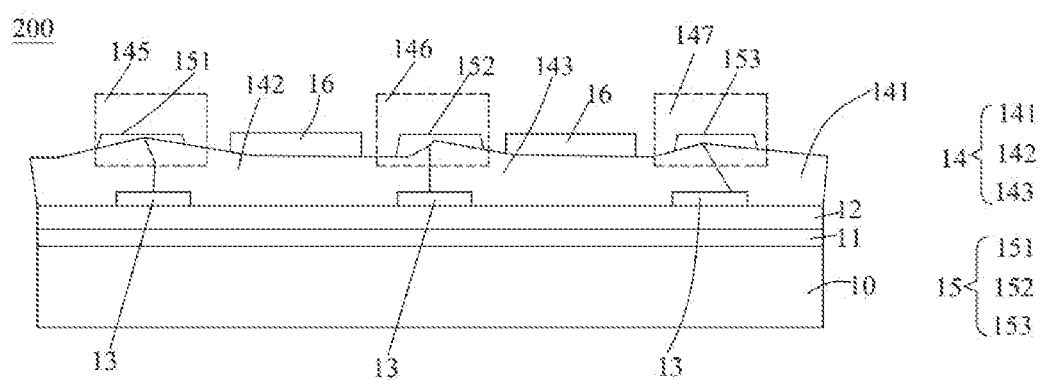
FIG. 5 is a schematic cross-sectional view taken along line B-B of the partial structure of the display region of the display panel according to the first embodiment or a third embodiment of the present application.
Figure 6:
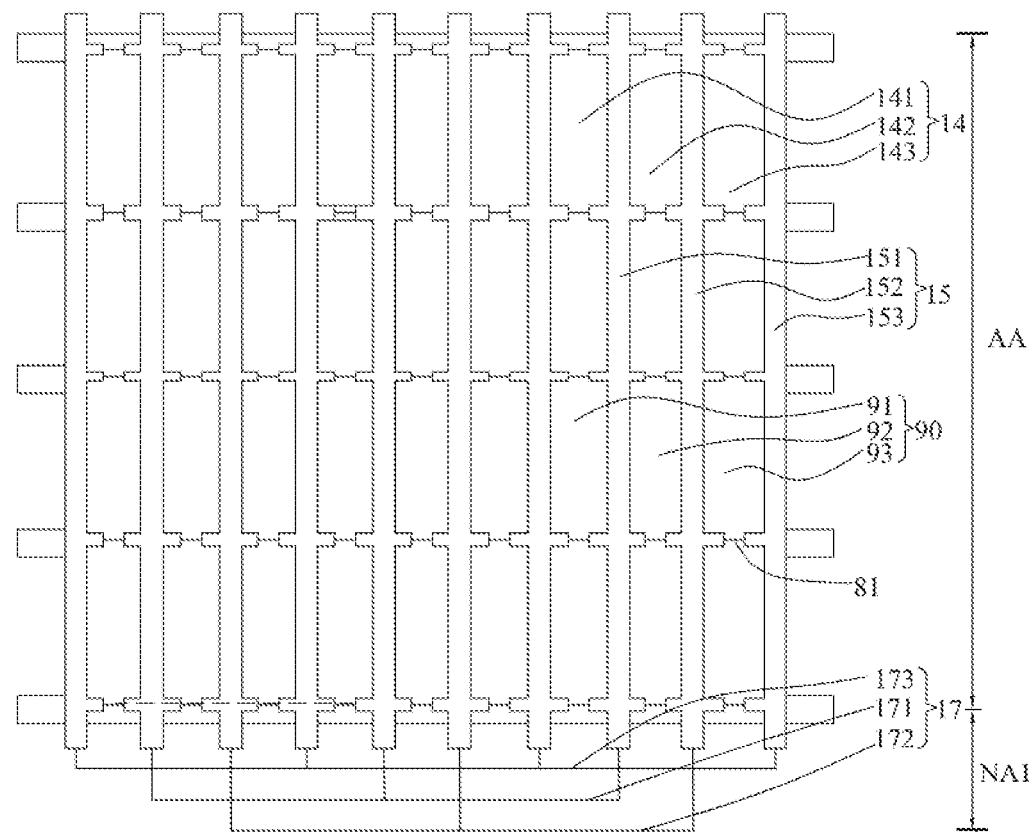
FIG. 6 is a schematic top view of the partial structure of the display region and a non-display region of the display panel according to the first embodiment or a second embodiment of the present application.

Refer to FIG. 4, FIG. 5, and FIG. 6. In the present embodiment, a display panel is provided, which includes a display region and a non-display region surrounding the display region. The display panel includes a plurality of data lines 13 positioned in the display region and arranged along a first direction; a plurality of scan lines 11 positioned in the display region and arranged along a second direction, wherein the second direction is perpendicular to the first direction; a plurality of sub-pixels 90 are positioned at intersections of the data lines 12 and the scan lines 11; and a plurality of light-shielding electrodes 15 are positioned in the display region and are arranged along the first direction. Please refer to FIG. 6, the display panel is further provided with a plurality of connection lines 17, which are positioned in the non-display region NA1. With reference to FIGS. 4, 5, and 6, each of the light-shielding electrodes 15 overlaps the data lines 13 corresponding to the light-shielding electrodes, each two of the light-shielding electrodes 15 are not connected to each other, and each of the connection lines 17 is connected to one of the light-shielding electrodes 15.

For details, please refer to FIG. 4, FIG. 5, and FIG. 6. FIG. 4 is a top view of a partial structure of the display region of the display panel, FIG. 5 is a cross-sectional schematic view of the partial layer structure taken along line B-B in FIG. 4, and FIG. 6 is a schematic top view of the partial structure of the display region AA and the non-display region NA1 of the display panel. The display region of the display panel includes, but is not limited to, the substrate 10, scan lines 11, an insulating layer 12, data lines 13, a color resist layer 14, light-shielding electrodes 15, and pixel electrodes 16. The color resist layer 14 includes a plurality of first color resists 141, a plurality of second color resists 142, and a plurality of third color resists 143. The first color resists 141 and the second color resists 142 have overlapping portions of horns 145 above the data lines 13, the second resists 142 and the third color resists 143 have overlapping portions of horns 146 above the data lines 13, and the third color resists 143 and the first color resists 141 have overlapping portions of horns 147 above the data lines 13, and the light-shielding electrodes 15 are provided on surfaces of the horns 145, 146, and 147. The light-shielding electrodes 15 include a plurality of first light-shielding electrodes 151 covering the horns 145, a plurality of second light-shielding electrodes 152 covering the horns 146, and a plurality of third light-shielding electrodes 153 covering the horns 147. The light-shielding electrodes 151, the light-shielding electrodes 152, and the light-shielding electrodes 153 are not connected to each other, and each of the connection lines 17 is connected to corresponding one of the light-shielding electrodes. For example, in FIG. 6, the connection lines 17 include a first connection line 171, a second connection line 172, and a third connection line 173, the first connection line 171 connects the plurality of first light-shielding electrodes 151, the second connection line 172 connects the plurality of second light-shielding electrodes 152, and the third connection line 173 connects the plurality of third light-shielding electrodes 153.

In the present embodiment, a sub-pixel 90 includes a first sub-pixel 91, a second sub-pixel 92, and a third sub-pixel 93, and the first sub-pixel 91 includes a first color resist 141, the second sub-pixel 92 includes a second color resist 142, and the third sub-pixel 93 includes a second color resist 143.

Figure 7:
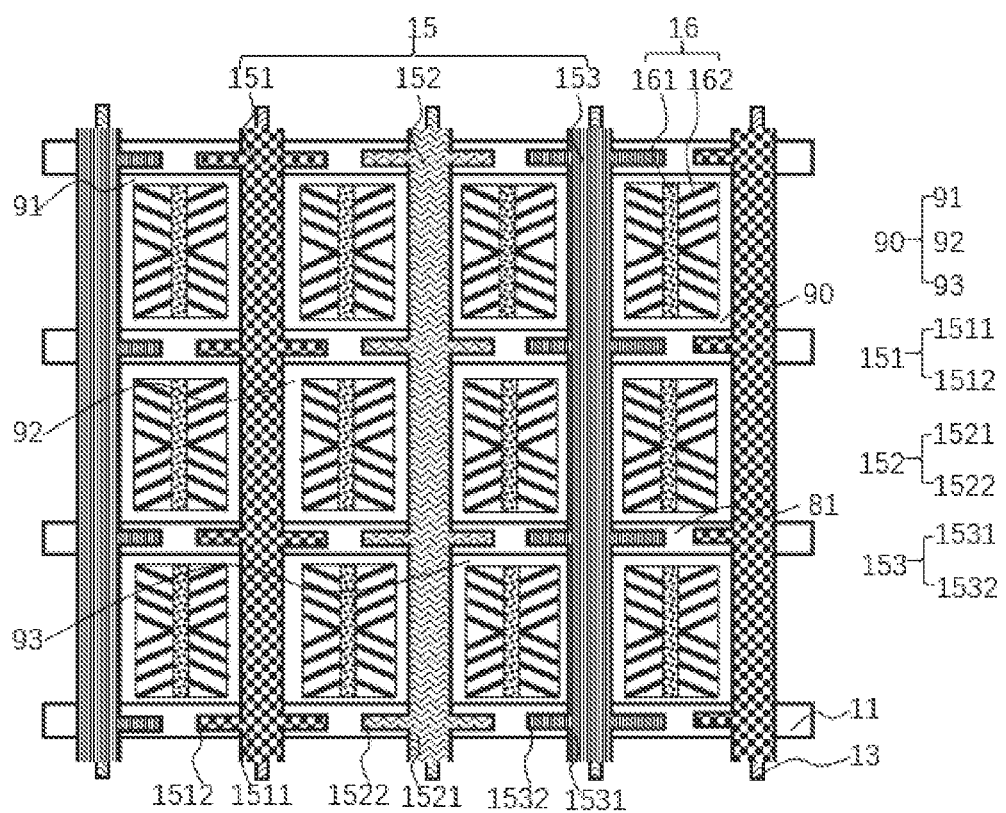
FIG. 7 is an enlarged schematic plane view of the partial structure of the display region of the display panel according to the first embodiment of the present application.

Please refer to FIG. 7, for ease of observation, FIG. 7 illustrates an enlarged top view of a partial structure of the display region. In the figure, each of the light-shielding electrodes includes a body extending in the second direction and extension portions extending from the body toward adjacent ones of the light-shielding electrodes, and the openings are provided between the extension portions of every two adjacent ones of the light-shielding electrodes. Specifically, the first light-shielding electrodes 151 include the body 1511 extending in the second direction, and the plurality of extension portions 1512 extending from the body 1511 toward the adjacent light-shielding electrodes 152/153. The second light-shielding electrodes 152 include the body 1521 extending in the second direction, and the plurality of extension portions 1522 extending from the body 1521 toward the adjacent light-shielding electrodes 151/153. The third light-shielding electrodes 153 include the body 1531 extending in the second direction, and the plurality of extension portions 1532 extending from the body 1531 toward the adjacent light-shielding electrodes 151/152. Openings 81 are provided between the extension portion 1512 and the extension portion 1522, between the extension portion 1522 and the extension portion 1532, and between the extension portion 1532 and the extension portion 1512. The openings 81 insulate and disconnect the extensions of the adjacent light-shielding electrodes 15, so that the adjacent light-shielding electrodes 15 are not connected to each other in the display region.

Please continue to refer to FIG. 7, the body of each of the light-shielding electrodes overlaps the corresponding data lines, and each of the openings overlaps the corresponding scan lines. Specifically, the body 1511 of the first light-shielding electrodes 151 overlaps the corresponding data lines 13, the body 1521 of the second light-shielding electrodes 152 overlaps the corresponding data lines 13, and the body 1531 of the third light-shielding electrodes 153 overlaps the corresponding data lines 13. The plurality of openings 81 positioned between the plurality of extension portions 1512 and the plurality of extension portions 1522, between the plurality of extension portions 1522 and the plurality of extension portions 1532, and between the plurality of extension portions 1532 and the plurality of extension portions 1512 overlap the corresponding scan lines 11. It should be noted that "overlap" here means that the body 1511/1521/1531 of the light-shielding electrodes is positioned on a side of the data lines 13 away from or close to the substrate 10, and an orthographic projection of the body 1511/1521/1531 of the light-shielding electrodes perpendicular to a surface of the substrate 10 at least partially coincides with an orthographic projection of the data lines 13 perpendicular to the surface of the substrate 10; "overlap" here means that the openings 81 are positioned on a side of the scan lines 11 away from or near the substrate 10, and an orthographic projection of the openings 81 perpendicular to the surface of the substrate 10 at least partially coincides with an orthographic projection of the scan lines 11 perpendicular to the surface of the substrate 10.

Please continue to refer to FIG. 7, each sub-pixel includes a pixel electrode, and the pixel electrode includes a trunk portion extending in the second direction, wherein an extension line of the trunk portion passes through an opening positioned between two adjacent light-shielding electrodes sandwiching the pixel electrode. Specifically, taking a vertical alignment (VA) type liquid crystal display panel as an example, particularly a multi-domain VA (MVA) liquid crystal display panel as an example, a plurality of data lines 13 and a plurality of scan lines 11 enclosing into a plurality of sub-pixels 90, each of the sub-pixels includes a pixel electrode 16, the pixel electrode 16 includes an electrode trunk 161 extending in the second direction and a plurality of electrode branches 162, and the extension line of the electrode trunk 161 passes through the opening 81 positioned between two adjacent light-shielding electrodes 15 sandwiching the pixel electrode 16.

Please continue to refer to FIG. 7, each of the sub-pixels is positioned between the bodies of two adjacent ones of the light-shielding electrodes and between four adjacent ones of the extension portions of the two adjacent ones of the light-shielding electrodes. Specifically, each of the sub-pixels 16 is positioned between the body 1511 of the first light-shielding electrode 151, the two extension portions 1512 of the first light-shielding electrode 151, the body 1521 of the second light-shielding electrode 152, and the two extension portions 1522 of the second light-shielding electrode 152, wherein the first light-shielding electrode 151 is positioned adjacent to the second light-shielding electrode 152; or each of the sub-pixels 16 is positioned between the body 1521 of the second light-shielding electrode 152, the two extension portions 1522 of the second light-shielding electrode 152, the body 1531 of the third light-shielding electrode 153, and the two extension portions 1532 of the third light-shielding electrode 153, wherein the second light-shielding electrode 152 is positioned adjacent to the third light-shielding electrode 153; or each of the sub-pixels 16 is positioned between the body 1531 of the third light-shielding electrode 153, the two extension portions 1532 of the third light-shielding electrode 153, the body 1511 of the first light-shielding electrode 151, and the two extension portions 1512 of the first light-shielding electrode 151, wherein the third light-shielding electrode 153 is positioned adjacent to the first light-shielding electrode 151.

In the display panel provided with the above-mentioned light-shielding electrodes and connection lines, the display panel can further include a control chip electrically connected to the first connection line 171, the second connection line 172, and the third connection line 173, and the connection lines are respectively supplied with electrical signals. By supplying electrical signals to the first light-shielding electrode 151 through the first connection line 171, to the second light-shielding electrode 152 through the second connection line 172, and to the third light-shielding electrode 153 through the third connection line 173, respectively, so as to simultaneously improve a shading and a shielding effect of the light-shielding electrodes between different sub-pixels or different color sub-pixels in the display region, the deterioration of display image quality caused by the shift (or asymmetry) of light-shielding electrodes on horn surfaces of adjacent part of the different sub-pixels or different color sub-pixels is prevented.

The beneficial effect of the present embodiment is that the light-shielding electrodes in the display region are not connected to each other, and in the non-display region, the light-shielding electrodes positioned between different sub-pixels or different color sub-pixels are electrically connected through different connection lines, respectively. Moreover, the connection lines are respectively supplied with electrical signals, so as to simultaneously improve a shading and a shielding effect of the light-shielding electrodes between different sub-pixels or different color sub-pixels in the display region, preventing the deterioration of display image quality caused by the shift (or asymmetry) of light-shielding electrodes on horn surfaces of adjacent part of the different sub-pixels or different color sub-pixels.

Second Embodiment

Figure 8:
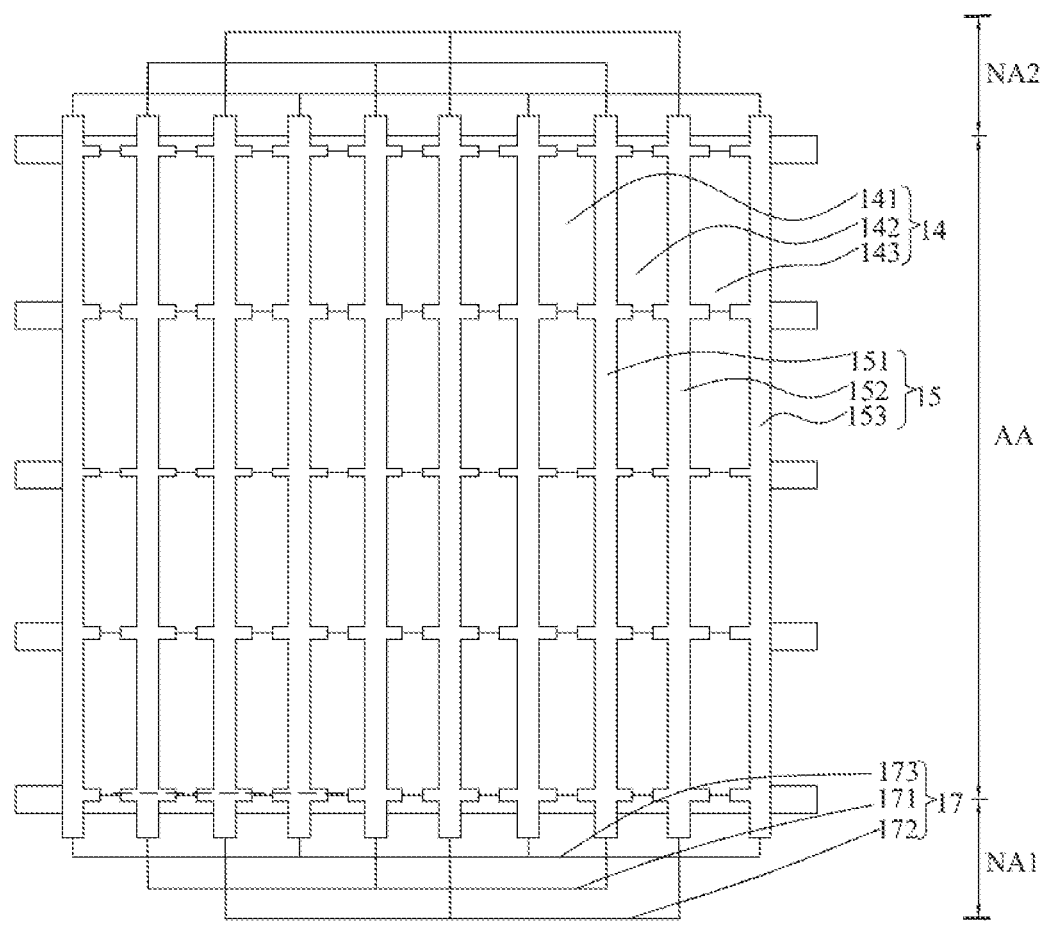
FIG. 8 is a schematic top view of the partial structure of the display region and the non-display region of the display panel according to the first embodiment or the second embodiment of the present application.

Please refer to FIG. 6 and FIG. 8, the present embodiment is same as or similar to the above embodiment, the difference is that the present embodiment further describes an arrangement of connecting electrodes, the display panel includes the display region AA and the non-display region NA, the non-display region includes a plurality of non-display sub-regions, for example, the non-display regions include a non-display sub-region NA1 and a non-display sub-region NA2. As shown in FIG. 4, the connection lines 17 can be provided in one non-display sub-region NA1 of the non-display region NA; as shown in FIG. 8, the connection lines 17 can be provided in two non-display sub-regions NA1/NA2 of the non-display region NA. Preferably, the two non-display sub-regions are oppositely disposed. In some implementations, the connection lines 17 can be provided in the plurality of non-display sub-regions, for example, three non-display sub-regions.

In some embodiments and implementations, the connection lines 17 include a first connection line 171, a second connection line 172, and a third connection line 173, and the connection lines 17 are respectively connected to the corresponding light-shielding electrodes 15, as shown in FIGS. 4 and 8. The first connection line 171 is electrically connected to the first light-shielding electrodes 151, the second connection line 172 is electrically connected to the second light-shielding electrodes 152, and the third connection line 173 is electrically connected to the third light-shielding electrodes 153. The first connection line 171, the second connection line 172, and the third connection line 173 can be selectively made of a layer of metal, for example, the first connection line 171 is made of a first metal layer, and the second connection line 172 is made of a second metal layer, and the third connection line 173 is made of a third metal layer. The first metal layer, the second metal layer, and the third metal layer are insulated from each other. The first connection line 171, the second connection line 172, and the third connection line 173 can selectively adopt the plurality of metal layers, for example, the first connection line 171, the second connection line 172, and the third connection line 173 use the first metal layer as a body of the connection line, and the second metal layer is used as a bridge metal at an intersection between the first connection line 171, the second connection line 172, and the third connection line 173.

The beneficial effect of the present embodiment is that the light-shielding electrodes in the display region are not connected to each other, and in the non-display region, the light-shielding electrodes positioned between different sub-pixels or different color sub-pixels are electrically connected through different connection lines, respectively. Moreover, the connection lines are respectively supplied with electrical signals, so as to simultaneously improve a shading and a shielding effect of the light-shielding electrodes between different sub-pixels or different color sub-pixels in the display region, preventing the deterioration of display image quality caused by the shift (or asymmetry) of light-shielding electrodes on horn surfaces of adjacent part of the different sub-pixels or different color sub-pixels. Meanwhile, an implementation method of the connection lines is provided. The connection lines can be disposed in the non-display region and can be selectively disposed in one or more non-display sub-regions.

Third Embodiment

Figure 9:
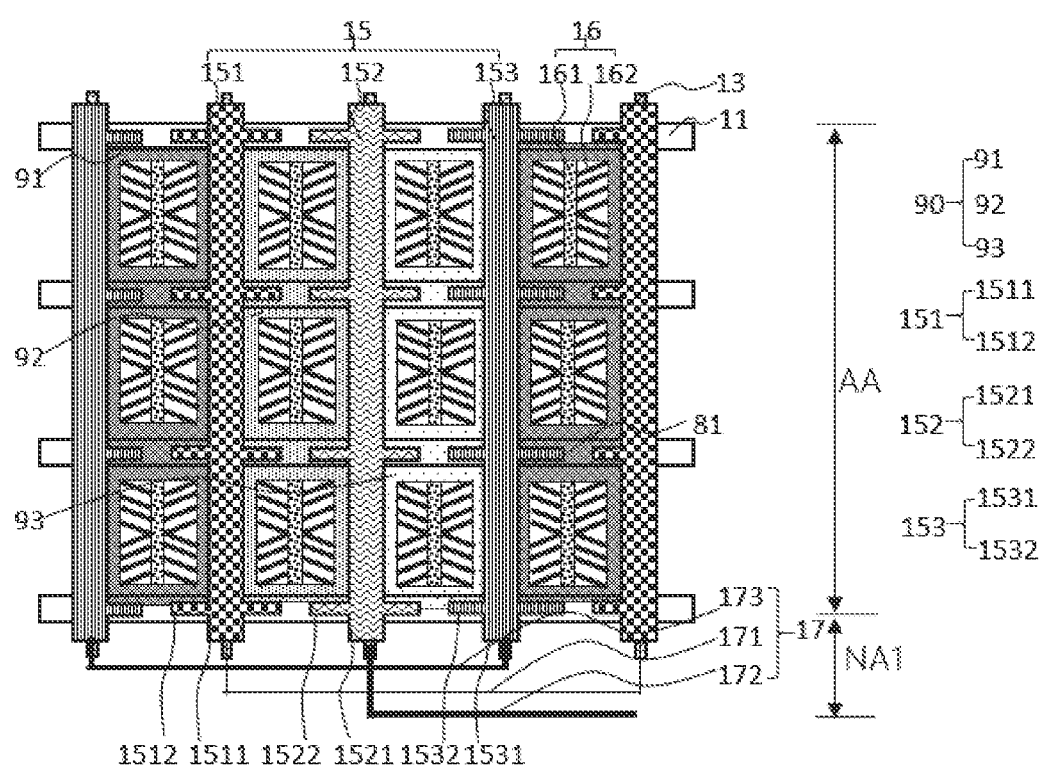
FIG. 9 is a schematic top view of the partial structure of the display region and the non-display region of the display panel according to the first embodiment or the third embodiment of the present application.

Please refer to FIG. 5 and FIG. 9, the present embodiment is same as or similar to the above-mentioned embodiments, and the difference is that a structure of the display panel is further described.

In some embodiments or implementation situations, the plurality of sub-pixels 90 include a plurality of first sub-pixels 91, a plurality of second sub-pixels 92, and a plurality of third sub-pixels 93. The plurality of first sub-pixels 91, the plurality of second sub-pixels 92, and the plurality of third sub-pixels 93 are arranged in an array along the first direction and the second direction. The plurality of light-shielding electrodes 15 include a plurality of first light-shielding electrodes 151, a plurality of second light-shielding electrodes 152, and a plurality of third light-shielding electrodes 153. Each of the first light-shielding electrodes 151 is positioned between a column of the first sub-pixels 91 and a column of the second sub-pixels 92 adjacent to the column of the first sub-pixels, each of the second light-shielding electrodes 92 is positioned between the column of the second sub-pixels 92 and a column of the third sub-pixels 93 adjacent to the column of the second sub-pixels, and each of the third light-shielding electrodes 93 is positioned between the column of the third sub-pixels 93 and the column of the first sub-pixels 91 adjacent to the column of the third sub-pixels. The connection lines 17 include a first connection line 171, a second connection line 172, and a third connection line 173, the first connection line 171 connects the plurality of first light-shielding electrodes 151, the second connection line 172 connects the plurality of second light-shielding electrodes 152, and the third connection line 173 connects the plurality of third light-shielding electrodes 153.

In some embodiments or implementations, the display panel includes an array substrate, the array substrate includes the substrate 10, and the data lines 13 are disposed on the substrate 10; the first sub-pixel 91 includes a red color resist, the second sub-pixel 92 includes a green color resist, and the third sub-pixel 93 includes a blue color resist. The red color resist, the green color resist, and the blue color resist are disposed on a side of the data lines 13 away from the substrate 10. The light-shielding electrodes 15 are disposed on sides of the red color resist, the green color resist, and the blue color resist away from the substrate 10, and coincide with the data lines 13. In some embodiments and implementations, the array substrate of the display panel further includes other layers or structures. For example, in an embodiment and implementation, the array substrate further includes a buffer layer provided on a side of the substrate, a gate formed on a side of the buffer layer, a gate insulating layer formed on a side of the gate and the buffer layer, an active layer formed on the side of the gate insulating layer and overlapping the gate, source-drains formed on a side of the gate insulating layer and electrically connected to a portion of the active layer, a color resist layer provided on a side of the source-drains, and the light-shielding electrodes provided on a side of the color resist layer away from the substrate. Although the structure of the array substrate is illustrated, it is not limited thereto. For example, an insulating layer or a planarization layer can be further provided between the color resist layer 14 and the data lines 13. For example, an insulating layer or a planarization layer can be further provided between the color resist layer 14 and the light-shielding electrodes 15. For example, a light-shielding metal can also be provided under the active layer near the substrate and on the substrate surface. For example, a thin film transistor (TFT) of the array substrate can be a top gate type or a bottom gate type, but is not limited to the above structure.

In some embodiments or implementation situations, the display panel can be a vertical alignment (VA) type liquid crystal display panel, and can particularly be a vertical alignment (VA) type liquid crystal display panel using CF on array (COA) technology.

In some embodiments or implementations, the display panel includes a black matrix, and the black matrix is arranged along the second direction and overlaps the corresponding scan lines, where "overlaps" means that the black matrix is positioned on sides of the scan lines 11 away from or near the substrate 10, and an orthographic projection of the black matrix perpendicular to the surface of the substrate 10 at least partially coincides with an orthographic projection of the scan lines 11 perpendicular to the surface of the substrate 10.

In some embodiments or implementation situations, the display panel can further include a color filter substrate provided with the above black matrix and a common electrode covering the black matrix.

The beneficial effect of the present embodiment is that the light-shielding electrodes in the display region are not connected to each other, and in the non-display region, the light-shielding electrodes positioned between different sub-pixels or different color sub-pixels are electrically connected through different connection lines, respectively. Moreover, the connection lines are respectively supplied with electrical signals, so as to simultaneously improve a shading and a shielding effect of the light-shielding electrodes between different sub-pixels or different color sub-pixels in the display region, preventing the deterioration of display image quality caused by the shift (or asymmetry) of light-shielding electrodes on horn surfaces of adjacent part of the different sub-pixels or different color sub-pixels. A preferred structure of the array substrate included in the display panel is also described.

Fourth Embodiment

Figure 10:
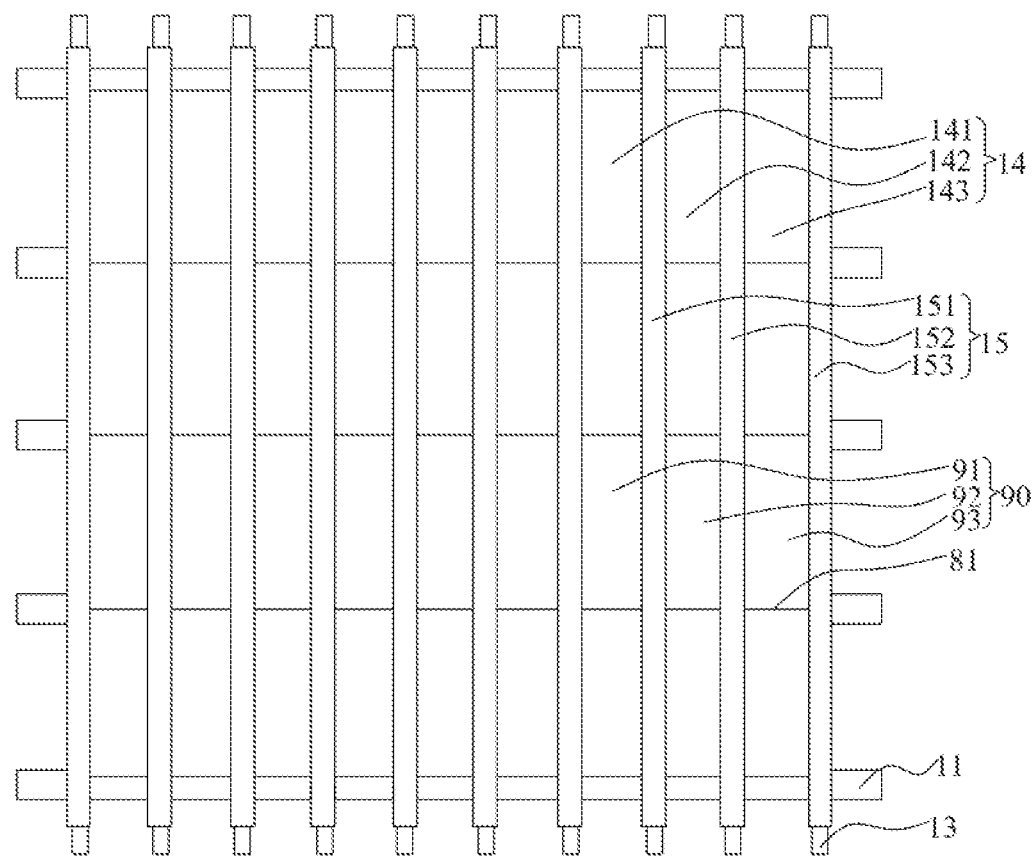
FIG. 10 is a schematic top view of the partial structure of the display region of the display panel according to a fourth embodiment of the present application.

Referring to FIG. 10, the present embodiment is same as or similar to the above embodiments, except that the light-shielding electrodes 15 can only be provided with a body or no extension portion, or the opening 81 positioned between two adjacent light-shielding electrodes 15 is sufficiently large so that the extension portion does not exist.

Fifth Embodiment

Figure 11:
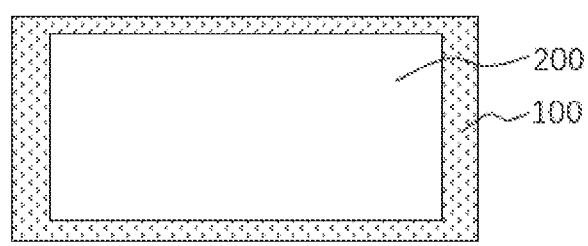
FIG. 11 is a schematic diagram of an electronic device according to a fifth embodiment of the present application.

Referring to FIG. 11, based on the above embodiments, the present application further provides an electronic device 100. The electronic device 100 includes one of the above-mentioned display panel 200. The electronic device 100 can be a television, a notebook computer, or the like.

In the above embodiments, the description of each embodiment has its own emphasis. For a part that is not detailed in an embodiment, it can be refer to the related descriptions of other embodiments.

The embodiments of the present application have been described in detail above, and specific examples have been used to explain the principles and implementations of the present application. Descriptions of above embodiments are only used to help understand technical solutions and core ideas of the application. A person skilled in the art can make various modifications and changes to the above embodiments without departing from the technical idea of the present invention, and such variations and modifications are intended to be within the scope of the invention.

What is claimed is:

1. A display panel, comprising a display region and a non-display region surrounding the display region, wherein the display panel further comprises:
    a plurality of data lines positioned in the display region and arranged along a first direction;
    a plurality of scan lines positioned in the display region and arranged along a second direction, wherein the second direction is perpendicular to the first direction;
    a plurality of sub-pixels positioned at intersections of the data lines and the scan lines;
    a plurality of light-shielding electrodes positioned in the display region and arranged along the first direction; and
    a plurality of connection lines positioned in the non-display region;
    wherein each of the light-shielding electrodes overlaps the data lines corresponding to the light-shielding electrodes, openings are provided between each two of the light-shielding electrodes so that each two of the light-shielding electrodes are not connected to each other, and each of the connection lines is connected to one of the light-shielding electrodes; and
    wherein each of the light-shielding electrodes comprises a body extending in the second direction and extension portions extending from the body toward adjacent ones of the light-shielding electrodes, and the openings are provided between the extension portions of every two adjacent ones of the light-shielding electrodes.

2. The display panel according to claim 1, wherein the body of each of the light-shielding electrodes overlaps the corresponding data lines, and each of the openings overlaps the scan lines corresponding to the openings.

3. The display panel according to claim 2, wherein each of the sub-pixels comprises a pixel electrode, and the pixel electrode comprises a trunk portion extending in the second direction, wherein an extension line of the trunk portion passes through the openings positioned between two adjacent ones of the light-shielding electrodes sandwiching the pixel electrode.

4. The display panel according to claim 2, wherein each of the sub-pixels is positioned between the bodies of two adjacent ones of the light-shielding electrodes and between four adjacent ones of the extension portions of the two adjacent ones of the light-shielding electrodes.

5. The display panel according to claim 1, wherein the plurality of sub-pixels comprise a plurality of first sub-pixels, a plurality of second sub-pixels, and a plurality of third sub-pixels, and the first sub-pixels, the second sub-pixels, and the third sub-pixels are arranged in an array along the first direction and the second direction;
    the plurality of light-shielding electrodes comprise a plurality of first light-shielding electrodes, a plurality of second light-shielding electrodes, and a plurality of third light-shielding electrodes, each of the first light-shielding electrodes is positioned between a column of the first sub-pixels and a column of the second sub-pixels adjacent to the column of the first sub-pixels, each of the second light-shielding electrodes is positioned between the column of the second sub-pixels and a column of the third sub-pixels adjacent to the column of the second sub-pixels, and each of the third light-shielding electrodes is positioned between the column of the third sub-pixels and the column of the first sub-pixels adjacent to the column of the third sub-pixels; and
    the connection lines comprise a first connection line, a second connection line, and a third connection line, the first connection line connects the plurality of first light-shielding electrodes, the second connection line connects the plurality of second light-shielding electrodes, and the third connection line connects the plurality of third light-shielding electrodes.

6. The display panel according to claim 5, further comprising a control chip electrically connected to the first connection line, the second connection line, and the third connection line.

7. The display panel according to claim 6, further comprising an array substrate, wherein the array substrate comprises a substrate and the data lines disposed on the substrate, each of the first sub-pixels comprises a red color resist, each of the second sub-pixels comprises a green color resist, each of the third sub-pixels comprises a blue color resist, the red color resist, the green color resist, and the blue color resist are disposed on a side of the data lines away from the substrate, and the light-shielding electrodes are disposed on sides of the red color resist, the green color resist, and the blue color resist away from the substrate.

8. The display panel according to claim 7, further comprising a black matrix, wherein the black matrix is arranged along the second direction and overlaps the scan lines corresponding to the black matrix.

9. An electronic device comprising a display panel, wherein the display panel comprises a display region and a non-display region surrounding the display region, and the display panel further comprises:
   a plurality of data lines positioned in the display region and arranged along a first direction;
   a plurality of scan lines positioned in the display region and arranged along a second direction, wherein the second direction is perpendicular to the first direction;
   a plurality of sub-pixels positioned at intersections of the data lines and the scan lines;
   a plurality of light-shielding electrodes positioned in the display region and arranged along the first direction; and
   a plurality of connection lines positioned in the non-display region;
   wherein each of the light-shielding electrodes overlaps the data lines corresponding to the light-shielding electrodes, openings are provided between each two of the light-shielding electrodes so that each two of the light-shielding electrodes are not connected to each other, and each of the connection lines is connected to one of the light-shielding electrodes; and
   wherein each of the light-shielding electrodes comprises a body extending in the second direction and extension portions extending from the body toward adjacent ones of the light-shielding electrodes, and the openings are provided between the extension portions of every two adjacent ones of the light-shielding electrodes.

10. The electronic device according to claim 9, wherein the body of each of the light-shielding electrodes overlaps the corresponding data lines, and each of the openings overlaps the scan lines corresponding to the openings.

11. The electronic device according to claim 10, wherein each of the sub-pixels comprises a pixel electrode, and the pixel electrode comprises a trunk portion extending in the second direction, wherein an extension line of the trunk portion passes through the openings positioned between two adjacent ones of the light-shielding electrodes sandwiching the pixel electrode.

12. The electronic device according to claim 10, wherein each of the sub-pixels is positioned between the bodies of two adjacent ones of the light-shielding electrodes and between four adjacent ones of the extension portions of the two adjacent ones of the light-shielding electrodes.

13. The electronic device according to claim 9, wherein the plurality of sub-pixels comprise a plurality of first sub-pixels, a plurality of second sub-pixels, and a plurality of third sub-pixels, and the first sub-pixels, the second sub-pixels, and the third sub-pixels are arranged in an array along the first direction and the second direction;
   the plurality of light-shielding electrodes comprise a plurality of first light-shielding electrodes, a plurality of second light-shielding electrodes, and a plurality of third light-shielding electrodes, each of the first light-shielding electrodes is positioned between a column of the first sub-pixels and a column of the second sub-pixels adjacent to the column of the first sub-pixels, each of the second light-shielding electrodes is positioned between the column of the second sub-pixels and a column of the third sub-pixels adjacent to the column of the second sub-pixels, and each of the third light-shielding electrodes is positioned between the column of the third sub-pixels and the column of the first sub-pixels adjacent to the column of the third sub-pixels; and
   the connection lines comprise a first connection line, a second connection line, and a third connection line, the first connection line connects the plurality of first light-shielding electrodes, the second connection line connects the plurality of second light-shielding electrodes, and the plurality of third connection line connects the third light-shielding electrodes.

14. The electronic device according to claim 13, further comprising a control chip electrically connected to the first connection line, the second connection line, and the third connection line.

15. The electronic device according to claim 14, wherein the display panel comprises an array substrate, the array substrate comprises a substrate and the data lines disposed on the substrate, each of the first sub-pixels comprises a red color resist, each of the second sub-pixels comprises a green color resist, each of the third sub-pixels comprises a blue color resist, the red color resist, the green color resist, and the blue color resist are disposed on a side of the data lines away from the substrate, and the light-shielding electrodes are disposed on sides of the red color resist, the green color resist, and the blue color resist away from the substrate.

16. The electronic device according to claim 15, wherein the display panel comprises a black matrix, and the black matrix is arranged along the second direction and overlaps the scan lines corresponding to the black matrix.

* * * * *